United States Patent
Souillard

[15] 3,651,377
[45] Mar. 21, 1972

[54] BALANCED CURRENT-DIRECTIONAL RELAY FOR THE DETECTION OF MULTIPHASE LINE DEFECTS

[72] Inventor: Michel Henry Pierre Souillard, Fontenay-aux-Roses, France

[73] Assignee: Compagnie Des Compteurs, Paris, France

[22] Filed: Aug. 10, 1970

[21] Appl. No.: 62,400

[30] Foreign Application Priority Data

Aug. 11, 1969 France..................................6927551

[52] U.S. Cl..............................317/27 R, 317/36 D, 324/86
[51] Int. Cl.......................................................H02h 3/26
[58] Field of Search..................317/36 D, 27 R; 324/107, 86

[56] References Cited

UNITED STATES PATENTS

| | | |
|---|---|---|
| 2,984,767 | 5/1961 | Lauper..............................317/36 D X |
| 2,922,109 | 1/1960 | Hodges et al.....................317/36 D X |
| 3,369,156 | 2/1968 | Souillard.............................317/36 D |
| 3,374,399 | 3/1968 | Dewey................................317/36 D |

Primary Examiner—James D. Trammell
Attorney—Pierce, Scheffler & Parker

[57] ABSTRACT

A triphase line current-directional relay includes a reference impedance fed by symmetrical components of the currents, a reference voltage and a phase computer connected both to the reference impedance and to the reference voltage.

4 Claims, 3 Drawing Figures

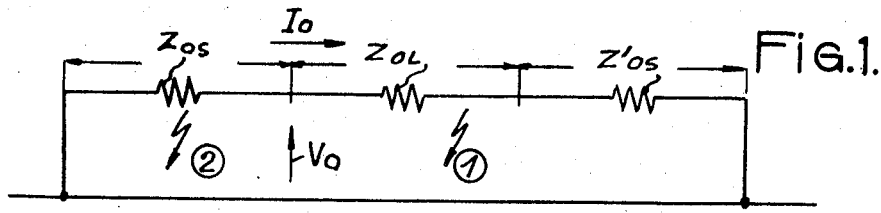
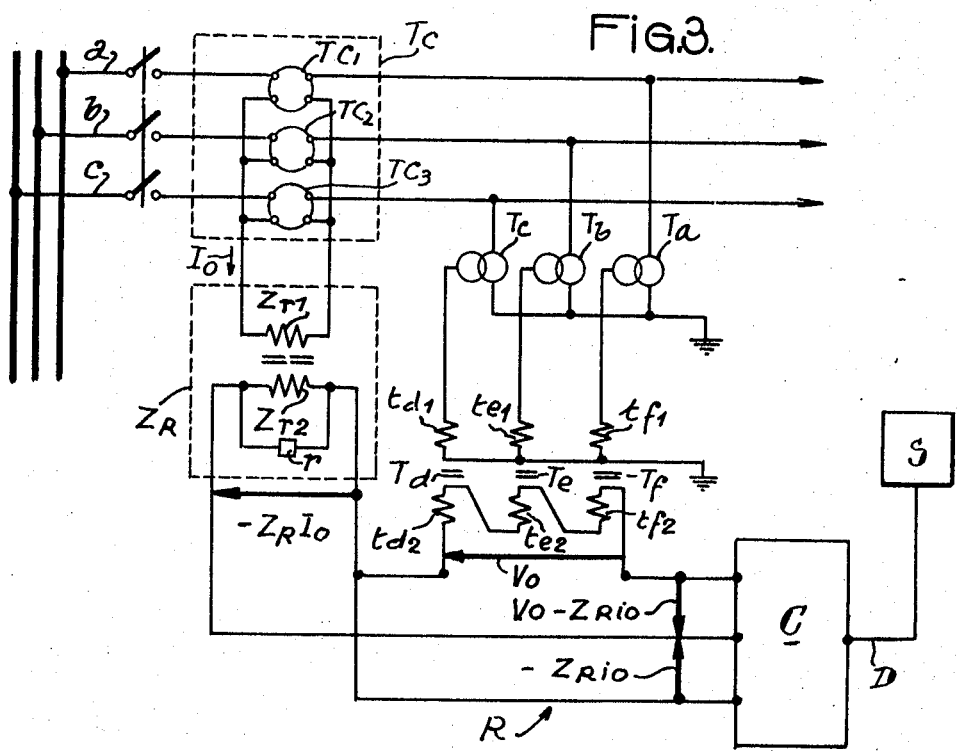
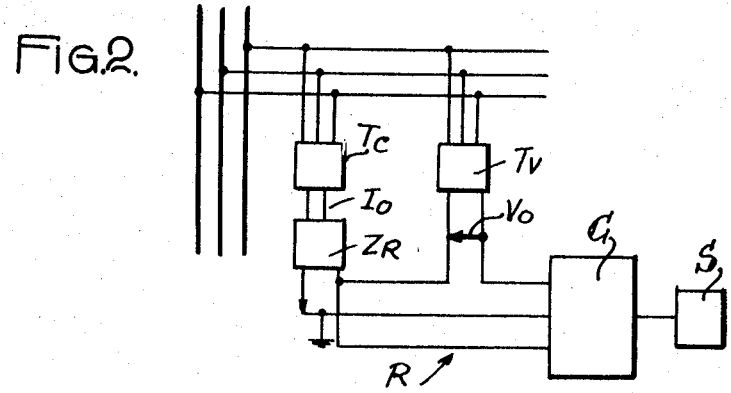

BALANCED CURRENT-DIRECTIONAL RELAY FOR THE DETECTION OF MULTIPHASE LINE DEFECTS

The invention relates to a balanced relay of the type generally in use on a triphase leading out line or more generally at a contrast-block.

It is of common knowledge that a conventional homopolar or zero-sequence current-directional relay is used to measure the relative displacement of homopolar values -voltage and current- at a leading out line terminal, in order to spot any ground defect upstream or downstream as compared with the junction point of the relay at a leading out line terminal, i.e., at the measurement point.

In the case of a high-voltage network including direct and multiple groundings of transformer neutrals, the homopolar impedance on the bar sets of the transformer blocks may be extremely low, while the homopolar impedance of a long line has a high value as compared with the homopolar impedance of the power supply units. As a result, the homopolar voltage measured at the leading out terminal may be extremely low in the case of a remote ground defect occuring close to the other line terminal.

The responsiveness of a conventional homopolar current-directional relay is in such case far too low, and the steering thereof may even be made erroneous if the homopolar voltage is too low as compared with the mismatching pseudo-homopolar voltage inherent in the actual mismatching with respect to the ratio of negative boosters which have to be used on high voltage lines.

The object of this invention is to overcome the aforesaid inconveniences by means of a triphase line current-directional relay wherein negative current boosters set into the three phases respectively supply, according to a balanced connection, a reference impedance supplying an initial reference voltage, proportional to a balanced component of the current, negative voltage boosters set into the three respective phases supply auxiliary transformers the corresponding secondary circuits thereof connected in open triangle supply a second reference voltage, proportional to a voltage of the same balanced component of the current, a phase comparator being connected, on the one hand, to the terminals of the reference impedance, and, on the other hand, to the outputs of said secondary circuits, thereby allowing the phase comparator to send out a logic order the state thereof being dependent on the relative phase displacement between the first reference voltage and a voltage equal to the sum of the first and the second reference voltages.

According to an embodiment of the invention, said negative current boosters supply the reference impedance through a homopolar connection so that said first reference voltage is proportional to the homopolar current, said auxiliary transformers supplying also a homopolar voltage serving as the second reference voltage.

According to another embodiment of the invention, the first and second reference voltages are replaced by the inverse values of currents and voltages deriving from reverse component filters and applied to the phase comparator.

Other features of the invention appear from the description which follows and from the accompanying drawings given as non-restrictive embodiment examples.

FIG. 1 is a single-phase homopolar diagram equivalent to that of a line.

FIG. 2 is a synoptic diagram of the relay arrangement constituting the object of the invention.

FIG. 3 illustrates an embodiment of the preferred form of the relay.

Although the invention is also applicable to inverse components, the invention is described hereinafter according to a preferred embodiment with reference to zero-sequence or homopolar components.

In the general case illustrated by FIG. 1, with respect for instance to a defect 1 situated downstream a measurement point A, the relation between zero-sequence or homopolar values may be written as follows:

$$Vo = -Z_{os} I_o \quad (1)$$

wherefrom $Zo = Vo/Io = -Z_{os}$ wherein:
Zo is the reference homopolar impedance "seen" at the junction point of the relay at the leading out terminal of the line;
Vo is the reference homopolar voltage;
Io is the reference homopolar current;
Zos is the source homopolar impedance upstream measurement point A.

In the case of a defect 2 situated upstream measurement point A, but downstream a point B representing the remote end of line AB checked by a protection device set at point A (a similar protection device is also set at point B), it applies that:

$$Vo = +(Z_{oL} + Z'_{os}) I_o \quad (2)$$

wherefrom $Zo = Vo/Io = Z_{oL} + Z'_{os}$ wherein:
$Z'_{os}$ is the homopolar impedance of the source situated downstream point B; and
$Z_{oL}$ the homopolar impedance of line AB.

In order to allow the reading of said both defect cases, the homopolar current-directional relay R (FIG. 2) includes a reference impedance $Z_R$ supplied by contingent defect current Io through a transformer Tc supplying a voltage $Z_R Io$. Said impedance $Z_R$ is a representation of a part of homopolar impedance $Z_{oL}$ of the line and is chosen with a similar argument to those used for homopolar impedances of the network units.

The moduli of the homopolar impedances of the network, either upstream point A (Zos), or downstream B (Z'os), have not practically to be known; however, they must have a non-infinite value to allow the existence of homopolar current Io and make possible directional measurement. Besides, the directional measurement process according to the invention implies that the argument of homopolar impedances Zos and Z'os be set at about the same value as that of homopolar impedance $Z_{oL}$ of the line. This is always the case with a high voltage network wherein the neutrals thereof are directly grounded.

A transformer $T_v$ connected with the three conductors supplies reference voltage Vo and a phase comparator unit C is supplied by reference voltages $(Vo - Z_R Io)$ and $(-Z_R Io)$.

The relative phase displacement of said two voltages is defined by the argument of the ratio of the complex expressions of said voltages, i.e.:

$$\frac{Vo - Z_R Io}{-Z_R Io} = -\frac{Vo}{Z_R Io} + 1 = -\frac{Zo}{Z_R} + 1 \quad (3)$$

wherein Zo is, as stated above, the value of the homopolar impedance "seen" at the junction point between the relay and the leading out line.

The carrying forward of Zo values, i.e., equations (1) and (2) into equation (3):

$$\frac{Zo}{Z_R} + 1,$$

which features the relay according to the invention, gives:

— Downstream defect case 1: $\dfrac{Z_{os}}{Z_R} + 1 \quad (4)$

— Upstream defect case 2: $-\dfrac{Z_{oL} + Z'_{os}}{Z_R} + 1 \quad (5)$

In order to simplify the equation, it will be assumed that all impedances Z have the same argument which is a common case. The impedance quotient is thus a real number which is equal to the impedance modulus ratio. The phase comparator unit C of the relay then takes into account the sign of equations (4) and (5).

Thereby, in the case of any downstream defect 1, the value $$\frac{Z_{os}}{Z_R} + 1$$

is positive, even in the low source impedance ultimate case, i.e., in the case where Zos tends to null.

In the case of any upstream defect 2, the value $$-\frac{Z_{oL}+Z'os}{Z_R}+1$$

must be negative but not null to allow distinctly the detection of any upstream defect. This condition will be answered by choosing for reference impedance $Z_R$ a value below that of the homopolar impedance of line $Z_{oL}$ and this whatever the value of $Z'os$ may be. Practically, $Z_R = \frac{1}{2} Z_{oL}$ will be chosen.

FIG. 3 illustrates in greater details an embodiment of relay R connected with leading out conductors $a$, $b$, $c$ of a triphase network including conductors $A_1$, $B_1$, $C_1$. Transformer $Tc$ forms negative current boosters $TC_1$, $TC_2$, $TC_3$ which energize by means of a homopolar connection the primary $Zr_1$ of impedance $Z_R$ made of a mutual inductance; the secondary thereof $Zr_2$ is shunted by a resistor $r$ so as to set the argument of reference impedance $Z_R$ and to supply a reference voltage $-Z_R Io$.

Negative voltage boosters $Ta$, $Tb$, $Tc$, connected with conductors $a$, $b$, $c$ of the triphase leading out line, supply the respective primaries $td_1$, $te_1$, $tf_1$ of three auxiliary transformers $Td$, $Te$, $Tf$ forming the transformer $T_V$ shown on FIG. 2, the respective secondaries $td_2$, $te_2$, $tf_2$ thereof being connected in open triangle so as to supply a voltage $Vo$ to the phase comparator C.

A great number of different types of static or electromechanical phase comparator relays are of common knowledge and, therefore, the description thereof is not essential for the understanding of the invention. It is sufficient that the comparator chosen establish Fresnel vectors representing voltages $Vo - Z_R Io$ and $-Z_R Io$ which are in-step in the case of a downstream defect and the same vectors in-opposition in the case of an upstream defect.

Phase comparator C must therefore send s distinct signal D for the two above cases; the so-called inversion zone of such a comparator thus corresponds to a square or $\pi/2$ displacement of the above mentioned vectors.

By way of illustration, a phase comparator fitted with a ring coder supplying a galvanometric relay may be given as an example.

From reference voltages $-Z_R Io$ and $Vo$, are obtained values $(Vo - Z_R Io)$ and $(-Z_R Io)$ which are applied as inputs to comparator C and which must answer the two upstream or downstream defect cases defined in equations (4) and (5).

Directional differentiation implies that the relative phase of voltages $(Vo - Z_R Io)$ and $(Z_R Io)$ be reversed in the case of a downstream defect with respect to the case of an upstream defect. Said condition is always answered if the tuning condition $Z_R < Z_{oL}$ mentioned above is actually carried out, since values defined in equations (4) and (5) have then always an opposite sign.

Output terminal D of phase comparator C sends a logic signal and the state thereof depends on the relative displacement of lead-in or input voltages $(Vo - Z_R Io)$ and $(-Z_R Io)$. Said signal is used, for instance, for the control of a circuit breaker S or a defect warning device.

In the foregoing, filters for voltage and current homopolar components are used, the filter of the homopolar components of the current giving $Io$ value $= \frac{1}{3}(Ia + Ib + Ic)$ being the transformer $Tc$ and the filter for voltage homopolar components giving $Vo$ value $= \frac{1}{3}(Va + Vb + Vc)$ being the transformer $T_v$ shown on FIG. 2.

Instead of transformers $Tc$ and $T_v$ mentioned above, filters may be set which are respectively responsive to the respective inverse symmetrical components of the currents and voltages in the various phase conductors. In this case, relay R operates according to the inverse values of current $Ii$ and voltage $Vi$ originated from the defect asymmetry, in the same manner as with homopolar values. The diagram is identical to that of FIG. 1 and, with respect to mathematic equations, the indices being merely changed. The formulae used for explaining the operation are identical to those described above but transposed in inverse values. To obtain a proper directional working, reference impedance $Z_R$ must be lower than the inverse impedance of line $Zi_L$. For the embodiment of the relay, phase comparator C must be supplied by the values originated from filters of voltage and current inverse components.

I claim:

1. A triphase line directional relay including negative current boosters set into the three respective phases, a reference impedance fed according to a symmetrical connection from said phases and supplying a first reference voltage proportional to a symmetrical component of the currents, negative voltage boosters set into the three respective phases and feeding auxiliary transformers, the secondaries thereof being connected in open triangle, thereby supplying a second reference voltage proportional to the same symmetrical component, and a phase comparator connected with the reference impedance and the secondary of the transformer, said phase comparator sending an output logic signal the state thereof being dependent on the relative phase displacement between the first reference voltage and a voltage equal to the sum of the first and second reference voltages.

2. A relay according to claim 1 wherein the first and second reference voltages are the homopolar components of the currents and voltages originated from voltage and current homopolar filters.

3. A relay according to claim 1 wherein the first and second reference voltages are the inverse values of currents and voltages originated from inverse component filters and are applied to the phase comparator.

4. A relay according to claim 1 wherein said negative current boosters supply the reference impedance by means of a homopolar connection, so that said first reference voltage is proportional to the homopolar current, said auxiliary transformers supplying also a homopolar voltage as said second reference voltage.

* * * * *